(12) United States Patent
DiPietro, Jr. et al.

(10) Patent No.: US 11,149,552 B2
(45) Date of Patent: Oct. 19, 2021

(54) SHROUD FOR SPLITTER AND ROTOR AIRFOILS OF A FAN FOR A GAS TURBINE ENGINE

(71) Applicant: General Electric Company, Schenectady, NY (US)

(72) Inventors: Anthony Louis DiPietro, Jr., Maineville, OH (US); Tyler James Alexander, Cincinnati, OH (US); Joseph Capozzi, North Reading, MA (US); Aspi Rustom Wadia, Loveland, OH (US); Andrew Breeze-Stringfellow, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 36 days.

(21) Appl. No.: 16/713,469

(22) Filed: Dec. 13, 2019

(65) Prior Publication Data

US 2021/0180458 A1 Jun. 17, 2021

(51) Int. Cl.
    *F01D 5/14* (2006.01)
    *F01D 9/04* (2006.01)
    (Continued)

(52) U.S. Cl.
    CPC ............. *F01D 5/141* (2013.01); *F01D 9/041* (2013.01); *F02C 7/36* (2013.01); *F02K 3/06* (2013.01);
    (Continued)

(58) Field of Classification Search
    CPC .......... F01D 5/141; F01D 9/041; F01D 5/146; F02C 7/36; F02K 3/06; F04D 29/324;
    (Continued)

(56) References Cited

U.S. PATENT DOCUMENTS

| 1,544,318 A | 6/1925 | Hodgkinson |
| 1,554,614 A | 9/1925 | Allen |

(Continued)

FOREIGN PATENT DOCUMENTS

| EP | 2644830 A2 | 10/2013 |
| EP | 2746534 A1 | 6/2014 |

(Continued)

OTHER PUBLICATIONS

International Application No. PCT/US17/141131 Filed Jul. 7, 2017.

(Continued)

*Primary Examiner* — Jesse S Bogue
(74) *Attorney, Agent, or Firm* — Fitch, Even, Tabin & Flannery, LLP

(57) ABSTRACT

A fan for a gas turbine engine is provided. The fan includes a rotor including at least one rotor stage having a rotatable disk defining a flowpath surface and an array of rotor airfoils extending outward from the flowpath surface; an array of splitter airfoils extending outward from the flowpath surface, wherein the splitter airfoils and the rotor airfoils are disposed in a sequential arrangement; and a shroud extending between the rotor airfoils and the splitter airfoils.

21 Claims, 9 Drawing Sheets

(51) Int. Cl.
  *F02K 3/06* (2006.01)
  *F04D 29/32* (2006.01)
  *F02C 7/36* (2006.01)

(52) U.S. Cl.
  CPC ........ *F04D 29/324* (2013.01); *F05D 2220/36* (2013.01); *F05D 2240/12* (2013.01); *F05D 2240/307* (2013.01); *F05D 2240/35* (2013.01)

(58) Field of Classification Search
  CPC ............. F05D 2220/36; F05D 2240/12; F05D 2240/307; F05D 2240/35
  See application file for complete search history.

(56) References Cited

U.S. PATENT DOCUMENTS

| | | |
|---|---|---|
| 2,699,319 A | 1/1955 | Huebner, Jr. et al. |
| 2,753,808 A | 7/1956 | Kluge |
| 3,040,971 A | 6/1962 | Pavlecka |
| 3,186,166 A * | 6/1965 | Grieb ...................... F02C 3/073 60/792 |
| 3,195,807 A | 7/1965 | Sheets |
| 3,262,635 A | 7/1966 | Smuland |
| 3,635,589 A * | 1/1972 | Kristiansen ........... F04D 25/166 416/193 R |
| 3,692,425 A | 9/1972 | Erwin |
| 3,729,957 A * | 5/1973 | Petrie ..................... F04D 25/028 60/226.1 |
| 3,837,761 A * | 9/1974 | Brown ..................... F01D 5/22 416/191 |
| 4,981,414 A | 1/1991 | Sheets |
| 4,991,389 A | 2/1991 | Schaefer |
| 5,002,461 A | 3/1991 | Young et al. |
| 5,056,738 A * | 10/1991 | Mercer .................. F04D 29/668 244/54 |
| 5,236,307 A | 8/1993 | Ng et al. |
| 5,275,531 A * | 1/1994 | Roberts ................... F01D 11/12 415/173.1 |
| 5,540,551 A * | 7/1996 | Heinig ..................... F01D 5/22 416/190 |
| 5,639,217 A | 6/1997 | Ohtsuki et al. |
| 5,649,419 A * | 7/1997 | Schaut .................... F02C 7/045 181/214 |
| 5,680,754 A | 10/1997 | Griffin et al. |
| 5,988,980 A * | 11/1999 | Busbey .................. F01D 5/225 416/193 R |
| 6,478,545 B2 | 11/2002 | Crall et al. |
| 6,508,626 B1 | 1/2003 | Sakurai et al. |
| 7,618,232 B2 | 11/2009 | Bil et al. |
| 7,753,652 B2 | 7/2010 | Truckenmueller et al. |
| 8,100,630 B2 * | 1/2012 | Guemmer ............... F02C 3/064 415/65 |
| 8,251,649 B2 | 8/2012 | Goto et al. |
| 8,257,032 B2 | 9/2012 | Beeck et al. |
| 8,529,210 B2 | 9/2013 | Merritt et al. |
| 8,672,618 B2 | 3/2014 | Guemmer |
| 9,422,864 B2 | 8/2016 | Sakekar et al. |
| 9,874,221 B2 | 1/2018 | DiPietro, Jr. et al. |
| 9,938,984 B2 | 4/2018 | DiPietro, Jr. et al. |
| 10,145,247 B2 * | 12/2018 | Orford .................. F04D 29/324 |
| 2007/0154314 A1 | 7/2007 | Jarrah et al. |
| 2008/0095614 A1 | 4/2008 | Aubin |
| 2009/0317237 A1 | 12/2009 | Wood et al. |
| 2009/0317238 A1 | 12/2009 | Wood et al. |
| 2010/0158684 A1 * | 6/2010 | Baralon .................. F01D 9/065 415/208.1 |
| 2011/0255964 A1 | 10/2011 | Clemen |
| 2013/0051996 A1 | 2/2013 | Hoeger et al. |
| 2014/0328675 A1 | 11/2014 | Derclaye et al. |
| 2015/0118080 A1 | 4/2015 | Dextraze |
| 2016/0186772 A1 | 6/2016 | DiPietro, Jr. et al. |
| 2016/0186773 A1 | 6/2016 | DiPietro, Jr. et al. |
| 2016/0245087 A1 | 8/2016 | Pesatori et al. |
| 2017/0009781 A1 | 1/2017 | Maniere et al. |
| 2018/0017019 A1 * | 1/2018 | DiPietro, Jr. ............. F02C 9/20 |
| 2018/0017079 A1 | 1/2018 | DiPietro, Jr. et al. |

FOREIGN PATENT DOCUMENTS

| | | |
|---|---|---|
| GB | 630747 A | 10/1949 |
| GB | 1514096 A | 6/1978 |
| GB | 2405184 A | 2/2005 |
| JP | H08189419 A | 7/1996 |
| WO | WO2008/155243 A1 | 12/2008 |
| WO | WO2016/055715 A2 | 4/2016 |

OTHER PUBLICATIONS

International Search Report and Written Opinion Issued in Connection with Corresponding PCT Application No. PCT/US2017/041131 dated Jul. 7, 2017.
International Application No. PCT/US17/40469 filed Jun. 30, 2017.
International Search Report and Written Opinion Issued in Connection with Corresponding PCT Application No. PCT/EP2017/040469 dated Apr. 9, 2018.
AlliedSignal/Honeywell Transonic Splittered Rotor Design for JTAGG (AFRL IHPTET Brochure) (Axial Flow with Full Span Splitter).

* cited by examiner

SHROUD FOR SPLITTER AND ROTOR AIRFOILS OF A FAN FOR A GAS TURBINE ENGINE

FIELD

The present subject matter relates generally to a gas turbine engine, or more particularly to a gas turbine engine having a fan assembly and a shroud for splitter and rotor airfoils.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

It is desirable to improve gas turbine engine performance, e.g., turbofan engine performance, over wider operating ranges than is presently possible. Multi-stage fans in turbofan engines can be relatively complex, heavy, and require additional moving parts in the fan module. Thus, it is desirable to improve rotor aerodynamic performance and reduce the weight of such fans.

BRIEF DESCRIPTION

Aspects and advantages of the invention will be set forth in part in the following description, or may be obvious from the description, or may be learned through practice of the invention.

In one exemplary embodiment of the present disclosure, a fan for a gas turbine engine is provided. The fan includes a rotor including at least one rotor stage having a rotatable disk defining a flowpath surface and an array of rotor airfoils extending outward from the flowpath surface; an array of splitter airfoils extending outward from the flowpath surface, wherein the splitter airfoils and the rotor airfoils are disposed in a sequential arrangement; and a shroud extending between the rotor airfoils and the splitter airfoils.

In certain exemplary embodiments the shroud is connected to the rotor airfoils at a position radially inward of a tip of each of the rotor airfoils and radially outward of a root of each of the rotor airfoils.

In certain exemplary embodiments the shroud is connected to the splitter airfoils at a position radially inward of a tip of each of the splitter airfoils and radially outward of a root of each of the splitter airfoils.

In certain exemplary embodiments the shroud is connected to a portion of a tip of each of the splitter airfoils.

In certain exemplary embodiments a first portion of the shroud is connected to a first splitter airfoil at a position radially inward of a tip of the first splitter airfoil and radially outward of a root of the first splitter airfoil, and wherein a second portion of the shroud is connected to a second splitter airfoil at a tip of the second splitter airfoil.

In certain exemplary embodiments a third portion of the shroud is disposed relative to a third splitter airfoil at a position adjacent to a tip of the third splitter airfoil.

In certain exemplary embodiments the shroud includes a plurality of linked shroud sections.

In certain exemplary embodiments a chord dimension of the splitter airfoil is less than a chord dimension of the rotor airfoil.

In certain exemplary embodiments a span dimension of the splitter airfoil is less than a span dimension of the rotor airfoil.

In certain exemplary embodiments the splitter airfoils and the rotor airfoils are disposed in a staggered and alternating arrangement.

In certain exemplary embodiments each splitter airfoil is located approximately midway between two adjacent rotor airfoils.

In another exemplary embodiment of the present disclosure, a gas turbine engine including a turbomachinery core operable to produce a flow of combustion gases and a turbine configured to extract energy from the combustion gases so as to drive a fan is provided. The fan includes a rotor including at least one rotor stage having a rotatable disk defining a flowpath surface and an array of rotor airfoils extending outward from the flowpath surface; an array of splitter airfoils extending outward from the flowpath surface, wherein the splitter airfoils and the rotor airfoils are disposed in a sequential arrangement; and a shroud extending between the rotor airfoils and the splitter airfoils.

In certain exemplary embodiments the shroud is connected to the rotor airfoils at a position radially inward of a tip of each of the rotor airfoils and radially outward of a root of each of the rotor airfoils.

In certain exemplary embodiments the shroud is connected to the splitter airfoils at a position radially inward of a tip of each of the splitter airfoils and radially outward of a root of each of the splitter airfoils.

In certain exemplary embodiments the shroud is connected to a portion of a tip of each of the splitter airfoils.

In certain exemplary embodiments a first portion of the shroud is connected to a first splitter airfoil at a position radially inward of a tip of the first splitter airfoil and radially outward of a root of the first splitter airfoil, and wherein a second portion of the shroud is connected to a second splitter airfoil at a tip of the second splitter airfoil.

In certain exemplary embodiments a third portion of the shroud is disposed relative to a third splitter airfoil at a position adjacent to a tip of the third splitter airfoil.

In certain exemplary embodiments the shroud includes a plurality of linked shroud sections.

In certain exemplary embodiments a chord dimension of the splitter airfoil is less than a chord dimension of the rotor airfoil.

In certain exemplary embodiments a span dimension of the splitter airfoil is less than a span dimension of the rotor airfoil.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Figure 1:
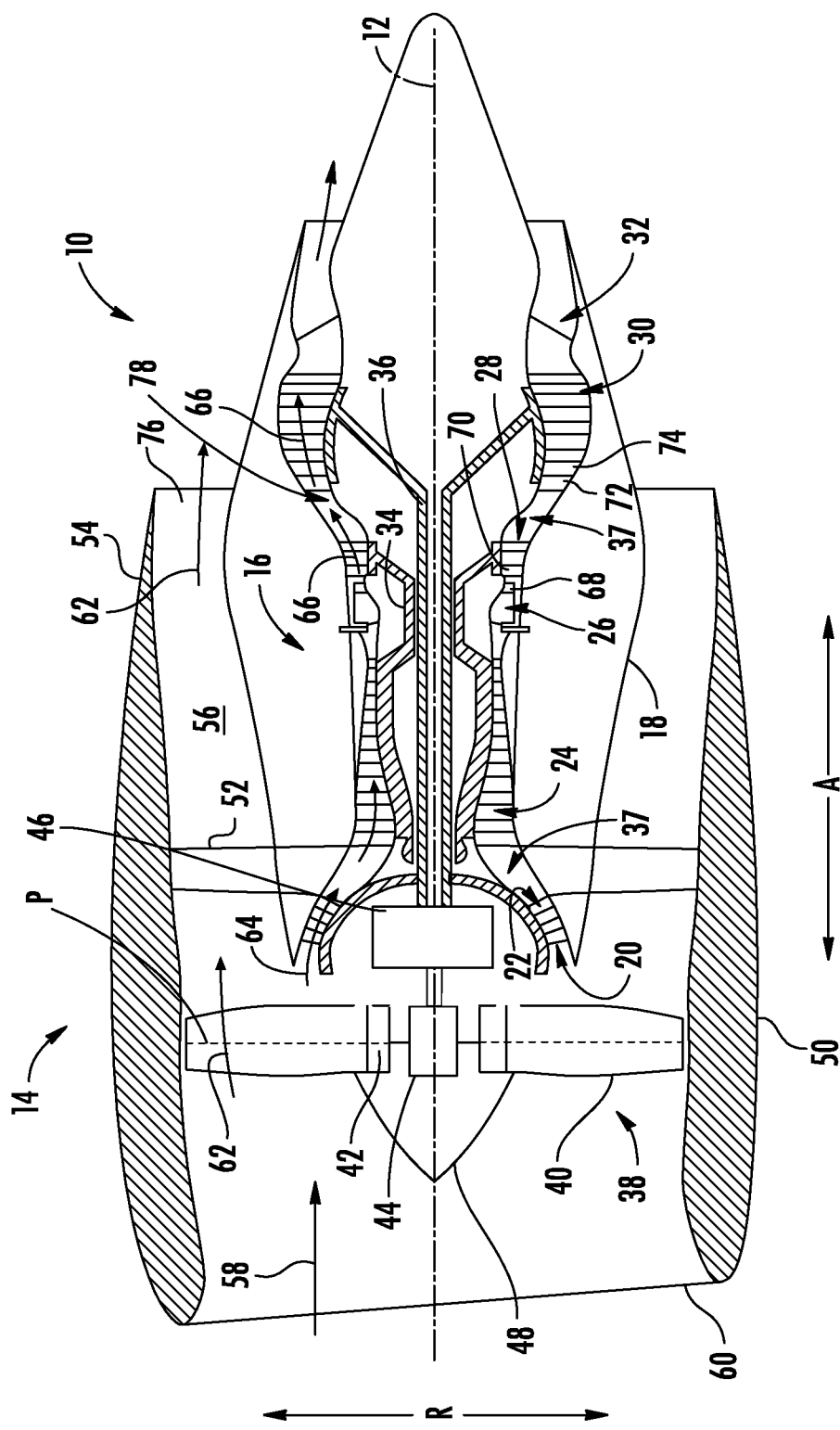
FIG. 1 is a schematic, cross-sectional view of an exemplary gas turbine engine in accordance with exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin. Here and throughout the specification and claims, range limitations are combined and interchanged, such ranges are identified and include all the sub-ranges contained therein unless context or language indicates otherwise.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A multi-stage fan splittered rotor of the present disclosure includes an array of rotor airfoils, an array of splitter airfoils, and a shroud extending between the rotor airfoils and the splitter airfoils as described and shown herein. A shroud of the present disclosure improves rotor aerodynamic performance and simultaneously reduces weight of the fan design. For example, the shroud of the present disclosure improves rotor performance, e.g., partial tip shroud allowing corner clearance flow benefits, and reduces full airfoil hub thickness requirements for frequency placement by using the shroud to set modal frequencies to thereby improve performance, hub pressure ratio, weight, and sensitivity to clearances.

Synergistically incorporating the splitter airfoils with the rotor airfoils using the shroud of the present disclosure solves the above-described technical problems and enables (1) a reduced weight design, (2) improved aerodynamic performance and stall range by enabling thinner airfoils and more aggressive levels of rotor leading edge forward sweep, (3) elimination of splitter blade tip vortex, which is another source of total pressure loss, further improving splittered rotor aerodynamic performance, (4) reduced sensitivity to rotor tip clearance by way of splittered rotor airfoil count reduction, and/or (5) supercharging of the fan hub airflow to higher total pressure levels before it travels into the core engine high pressure compressor inlet thereby helping to increase cycle operating pressure ratios.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline or axis 12 provided for reference) and a radial direction R. In general, the turbofan 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. Additionally, the compressor section, combustion section 26, and turbine section together define at least in part a core air flowpath 37 extending therethrough.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. The nacelle 50 is, for the embodiment depicted, supported relative to the turbomachine 16 by a plurality of circumferentially-spaced outlet guide vanes 52. Additionally, a downstream section 54 of the nacelle 50 extends over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the turbomachine 16.

Figure 2:
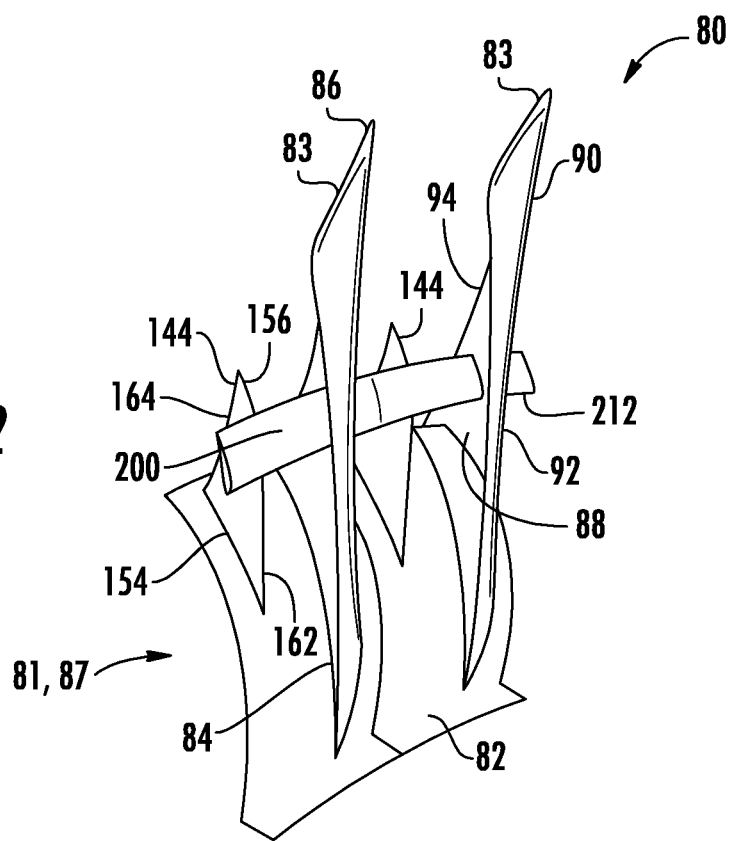
FIG. 2 is a first perspective view of a portion of a fan rotor including a shroud in accordance with an exemplary embodiment of the present disclosure.
Figure 3:
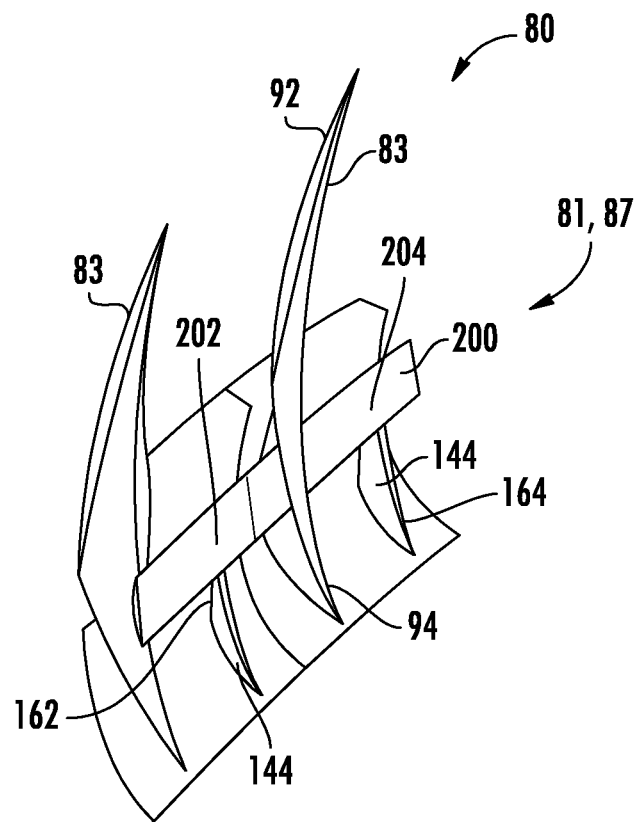
FIG. 3 is a second perspective view of a portion of a fan rotor including a shroud in accordance with an exemplary embodiment of the present disclosure.

In an exemplary embodiment of the present disclosure, the fan 14 may include a number of rotor stages, each of which includes a row of fan blades or rotor airfoils 83 mounted to a rotor 81 having a rotatable disk 87 (FIGS. 2 and 3). The fan 14 may also include at least one stator stage including a row of stationary or stator airfoils that serve to turn the airflow passing therethrough. As used herein, the term "fan" refers to any apparatus in a turbine engine having a rotor with airfoils operable to produce a fluid flow.

It is contemplated that the principles of the present invention are equally applicable to multi-stage fans, single-stage fans, and other fan configurations; as well as with low-bypass turbofan engines, high-bypass turbofan engines, and other engine configurations.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the turbofan engine 10 may be a direct drive turbofan engine (i.e., not including the power gearbox 46), may include a fixed pitch fan 38, etc. Additionally, or alternatively, aspects of the present disclosure may be incorporated into any other suitable gas turbine engine, such as a turboshaft engine, turboprop engine, turbojet engine, a land-based gas turbine engine for power generation, an aeroderivative gas turbine engine, etc.

FIGS. 2-13 illustrate exemplary embodiments of the present disclosure. Referring to FIGS. 2-5 and 14-16, in an exemplary embodiment, a portion of an exemplary rotor stage 80 of the present disclosure that is suitable for incorporation in a fan 14 for an engine 10 is illustrated. The fan 14 may include a number of rotor stages, each of which includes a row of fan blades or rotor airfoils 83 mounted to a rotor 81 having a rotatable disk 87. The rotor stage 80 of fan 14 includes a multi-stage fan splittered rotor having an array of rotor airfoils 83, an array of splitter airfoils 144, and a shroud 200 extending between the rotor airfoils 83 and the splitter airfoils 144 as described in more detail below. In at least certain exemplary embodiments, the exemplary multi-stage fan splittered rotor depicted in FIGS. 2-3 may be incorporated into, e.g., the exemplary engine 10 described above with reference to FIG. 1.

A shroud 200 of the present disclosure improves rotor aerodynamic performance and simultaneously reduces weight of the fan design. For example, the shroud 200 of the present disclosure improves rotor performance, e.g., partial tip shroud allowing corner clearance flow benefits, and reduces full airfoil hub thickness requirements for frequency placement by using the shroud 200 to set modal frequencies to thereby improve performance, hub pressure ratio, weight, and sensitivity to clearances.

Synergistically incorporating the splitter airfoils 144 with the rotor airfoils 83 using the shroud 200 solves the above-described technical problems and enables (1) a reduced weight design, (2) improved aerodynamic performance and stall range by enabling thinner airfoils and more aggressive levels of rotor leading edge forward sweep, (3) elimination of splitter blade tip vortex, which is another source of total pressure loss, further improving splittered rotor aerodynamic performance, (4) reduced sensitivity to rotor tip clearance by way of splittered rotor airfoil count reduction, and/or (5) supercharging of the fan hub airflow to higher total pressure levels before it travels into the core engine high pressure compressor inlet thereby helping to increase cycle operating pressure ratios.

The shroud 200 of the present disclosure extends between and connects the rotor airfoils 83 and the splitter airfoils 144. In this manner, the shroud 200 enables a lower maximum thickness-to-chord ratio in the hub region of the main blade or airfoil 83, which both reduces the weight of the "bladed disk" or "blisk" and improves the aerodynamic performance of the main blade or airfoil 83. The shroud 200 also improves splitter blade or airfoil performance by the removal of the tip vortex that is present without the shroud 200. In an exemplary embodiment, the airfoil performance of the present disclosure may include a rotor tip stagger of approximately 60 degrees to approximately 65 degrees. In an exemplary embodiment, the airfoil performance of the present disclosure may include a flow coefficient of approximately 0.3 to approximately 0.6. In one embodiment, the airfoil performance of the present disclosure may include a tip radius of approximately 19 inches to approximately 22 inches. In an exemplary embodiment, the airfoil performance of the present disclosure may include a tip speed of approximately 1400 ft/sec to approximately 1650 ft/sec.

Referring to FIGS. 2-5 and 14-16, in one embodiment, an exemplary rotor stage 80 of a fan 14 may include a number of rotor stages, each of which includes a row of fan blades or rotor airfoils 83 mounted to a rotor 81 having a rotatable disk 87. The fan 14 may also include at least one stator stage including a row of stationary or stator airfoils that serve to turn the airflow passing therethrough.

Figure 6:
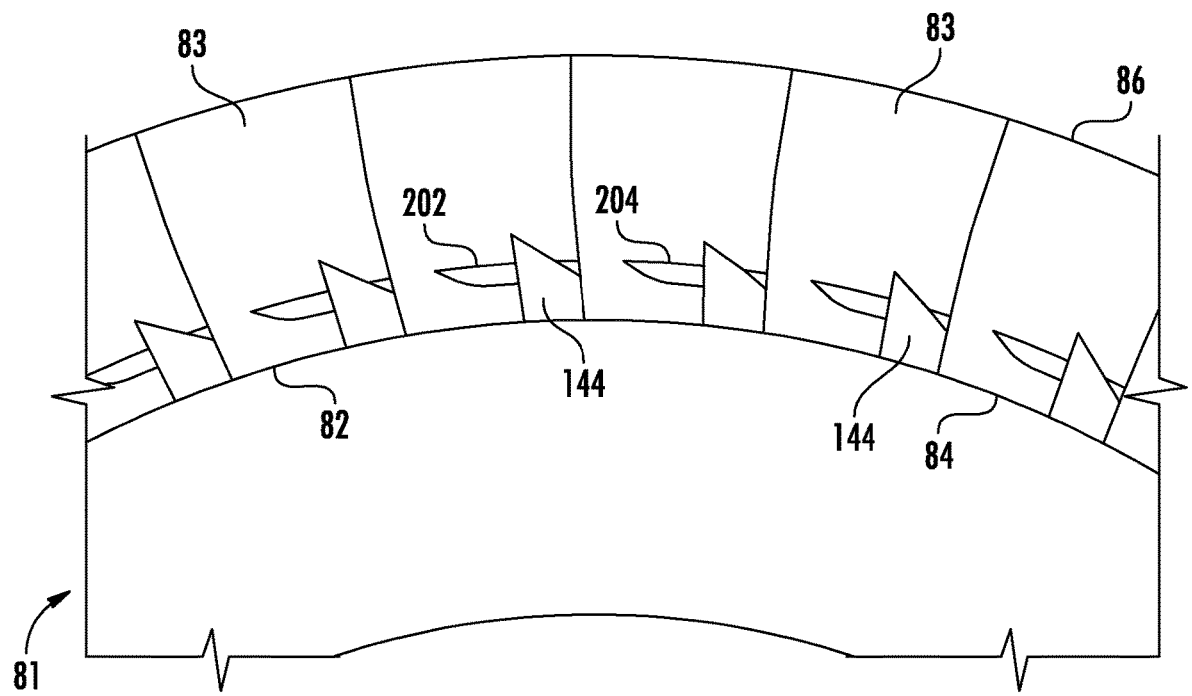
FIG. 6 is a detailed elevation view of a fan rotor including a shroud extending between the rotor airfoils and the splitter airfoils in accordance with an exemplary embodiment of the present disclosure.
Figure 14:
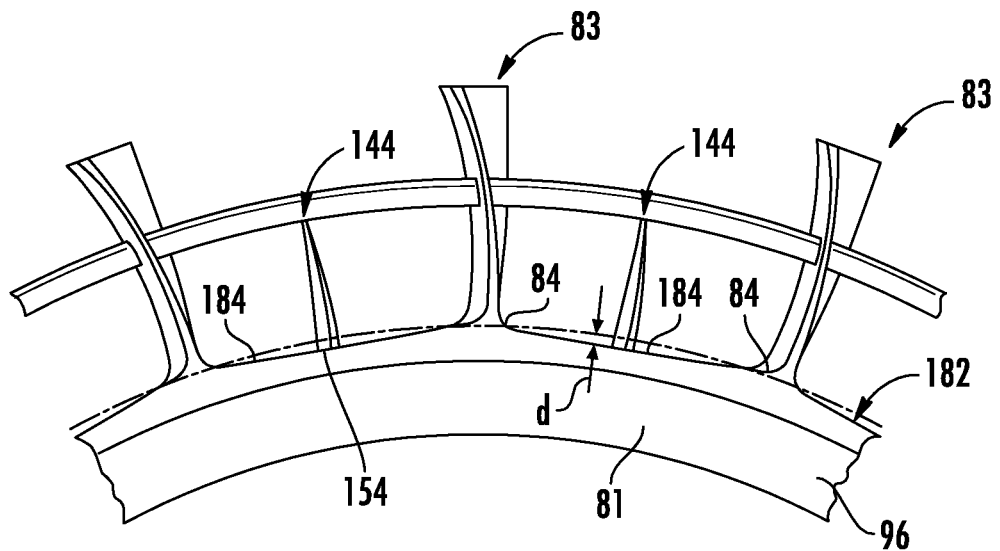
FIG. 14 is an elevation view of a portion of a fan rotor including a shroud extending between the rotor airfoils and the splitter airfoils in accordance with another exemplary embodiment of the present disclosure.

The rotor 81 defines an annular flowpath surface 82, a portion of which is shown in FIG. 2. Referring to FIGS. 2 and 6, in one embodiment, the flowpath surface 82 may have an axisymmetric surface profile. Referring to FIG. 14, in other embodiments, the flowpath surface may have a non-axisymmetric surface profile 182. For example, referring to FIG. 14, a non-axisymmetric surface profile may be contoured with a concave curve or "scallop" 184 between each adjacent pair of rotor airfoils 83. For comparison purposes, the dashed lines in FIG. 14 illustrate a hypothetical axisymmetric cylindrical surface with a radius passing through the roots 84 of the rotor airfoils 83. It can be seen that the non-axisymmetric flowpath surface 182 curvature has its maximum radius (or minimum radial depth "d" of the scallop 184) at the roots 84 of the rotor airfoils 83, and has its minimum radius (or maximum radial depth "d" of the scallop 184) at a position approximately midway between adjacent rotor airfoils 83, e.g., at the root 154 of a splitter airfoil 144.

In steady state or transient operation, this scalloped configuration (FIG. 14) is effective to reduce the magnitude of mechanical and thermal hoop stress concentration at the airfoil hub intersections on the rim 96 of the rotor 81 along the flowpath surface 182. This contributes to the goal of achieving acceptably-long component life of the disk 87 and the rotor 81.

Figure 4:
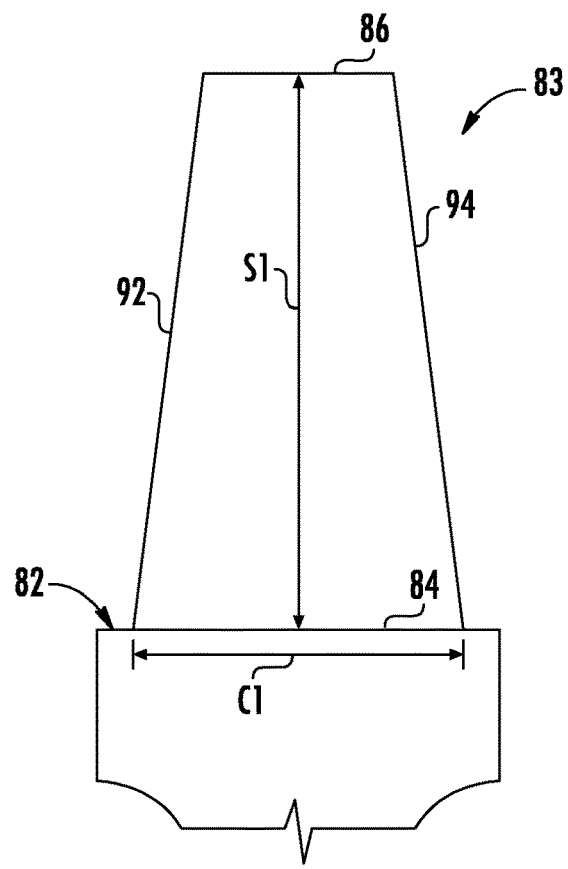
FIG. 4 is an elevation view of a rotor airfoil of a fan rotor in accordance with an exemplary embodiment of the present disclosure.

Referring to FIGS. 2, 3, 6, 7, and 14-16, the rotor 81 includes a plurality or array of rotor airfoils 83 extending outward from the flowpath surface 82. Each fan blade or rotor airfoil 83 extends from a root 84 at the flowpath surface 82 to a tip 86 and includes a concave pressure side 88 joined to a convex suction side 90 at a leading edge 92 and a trailing edge 94. Referring to FIG. 4, each rotor airfoil 83 has a span, or span dimension, "S1" defined as the radial distance from the root 84 to the tip 86, and a chord, or chord dimension, "C1" defined as the length of an imaginary straight line connecting the leading edge 92 and the trailing edge 94. Depending on the specific design of the rotor airfoil 83, its chord C1 may be different at different locations along the span S1. In one embodiment, a relevant measurement is the chord C1 at the root 84 of the rotor airfoil 83.

Figure 15:
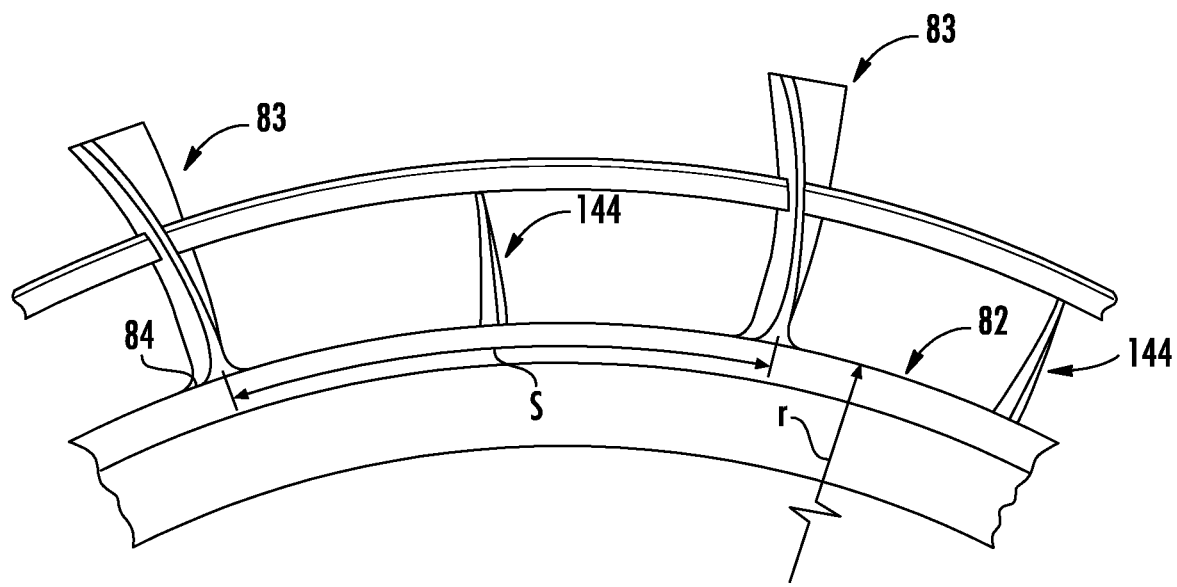
FIG. 15 is an elevation view of a portion of a fan rotor including a shroud extending between the rotor airfoils and the splitter airfoils in accordance with another exemplary embodiment of the present disclosure.

Referring to FIGS. 2, 3, 6, 7, and 14-16, in one embodiment, the rotor airfoils 83 are uniformly spaced apart around the periphery of the flowpath surface 82. Referring to FIG. 15, in one embodiment, a mean circumferential spacing "s" between adjacent rotor airfoils 83 is defined as $s=2\pi r/Z$, where "r" is a designated radius of the rotor airfoils 83 (for example at the root 84) and "Z" is the number of rotor airfoils 83. A non-dimensional parameter called "solidity" is defined as c/s, where "c" is equal to the blade chord as described above. In embodiments of the present disclosure, the rotor airfoils 83 may have a spacing which is significantly greater than a spacing that would be expected in the prior art, resulting in a blade solidity significantly less than would be expected in the prior art. This reduced solidity can minimize efficiency losses of the fan 14 and this reduced blade solidity can also have the effect of reducing weight and simplifying manufacturing by minimizing the total number of fan airfoils used in a given rotor.

An aerodynamically adverse side effect of reduced blade solidity is to increase the rotor passage flow area between adjacent rotor airfoils 83. This increase in rotor passage through flow area increases the aerodynamic loading level and in turn tends to cause undesirable flow separation on the suction side 90 of the rotor airfoil 83, at the inboard portion near the root 84, also referred to as "hub flow separation".

To reduce or prevent hub flow separation, the rotor stage 80 may be provided with splitters, or in a "splittered" configuration. Referring to FIGS. 2, 3, 6, 7, and 14-16, a plurality or an array of splitter blades or airfoils 144 extend outward from the flowpath surface 82. In an exemplary embodiment, one splitter airfoil 144 is disposed between each pair of adjacent rotor airfoils 83. For example, each splitter airfoil 144 may be located approximately midway between two adjacent rotor airfoils 83. In some embodiments, the splitter airfoils 144 and the rotor airfoils 83 are disposed in a sequential arrangement. In some exemplary embodiments, the splitter airfoils 144 and the rotor airfoils 83 are disposed in a staggered and alternating arrangement. It is contemplated that the splitter airfoils 144 and the rotor airfoils 83 may be arranged in other sequential configurations for a variety of different applications.

Referring to FIGS. 2, 3, 6, 7, and 14-16, in the circumferential direction, the splitter airfoils 144 may be located halfway or circumferentially biased between two adjacent rotor airfoils 83. In other words, the rotor airfoils 83 and splitter airfoils 144 alternate around the periphery of the flowpath surface 82.

Figure 5:
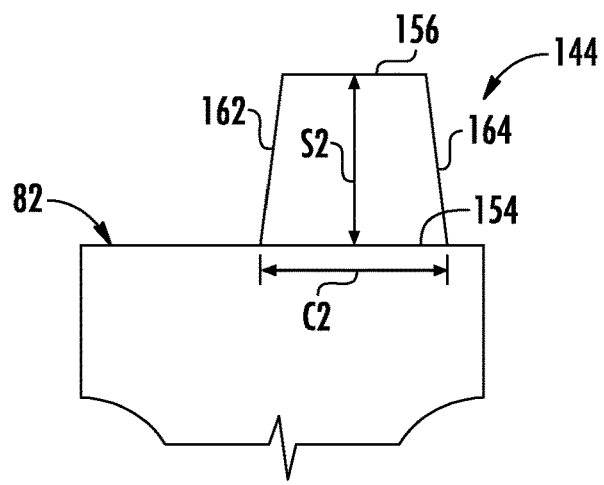
FIG. 5 is an elevation view of a splitter airfoil of a fan rotor in accordance with an exemplary embodiment of the present disclosure.

Referring to FIGS. 2, 3, 5, and 14-16, each splitter airfoil 144 extends from a root 154 at the flowpath surface 82 to a tip 156, and includes a concave pressure side 158 joined to a convex suction side 160 at a leading edge 162 and a trailing edge 164. Referring to FIG. 5, in one embodiment, each splitter airfoil 144 has a span, or span dimension, "S2" defined as the radial distance from the root 154 to the tip 156, and a chord, or chord dimension, "C2" defined as the length of an imaginary straight line connecting the leading edge 162 and the trailing edge 164. Depending on the specific design of the splitter airfoil 144, its chord C2 may be different at different locations along the span S2. In one embodiment, a relevant measurement is the chord C2 at the root 154 of the splitter airfoil 144.

Referring to FIGS. 4 and 5, in an exemplary embodiment, a chord dimension C2 of the splitter airfoil 144 is less than a chord dimension C1 of the rotor airfoil 83. Furthermore, in an exemplary embodiment, a span dimension S2 of the splitter airfoil 144 is less than a span dimension S1 of the rotor airfoil 83. For example, in some embodiments, the span S2 and/or the chord C2 of the splitter airfoils 144 may be some fraction less than the corresponding span S1 and chord C1 of the rotor airfoils 83. These may be referred to as "part-span" and/or "part-chord" splitter airfoils. For example, in some embodiments, the span S2 may be equal to or less than the span S1. In some embodiments, for reducing frictional losses, the span S2 is 50% or less of the span S1. In other embodiments, for the least frictional losses, the span S2 is 30% or less of the span S1. In some exemplary embodiments, the chord C2 may be equal to or less than the chord C1. In other exemplary embodiments, for the least frictional losses, the chord C2 is 80% or less of the chord C1. In one embodiment, the length of the chord C2 of the splitter airfoil 144 is approximately 25% to approximately 75% of the length of the chord C1 of the rotor airfoil 83. In one embodiment, the height of span S2 of the splitter airfoil 144 is approximately 20% to approximately 50% of the span S1 of the rotor airfoil 83.

The splitter airfoils 144 function to locally increase the hub solidity of the rotor stage 80 and thereby prevent the above-mentioned flow separation from the rotor airfoils 83. A similar effect could be obtained by simply increasing the number of rotor airfoils 83, and therefore reducing the blade-to-blade spacing. This, however, has the undesirable side effect of increasing aerodynamic surface area frictional losses which would manifest as reduced aerodynamic efficiency and increased rotor weight. Therefore, the dimensions of the splitter airfoils 144 and their position may be selected to prevent flow separation while minimizing their surface area.

Figure 7:
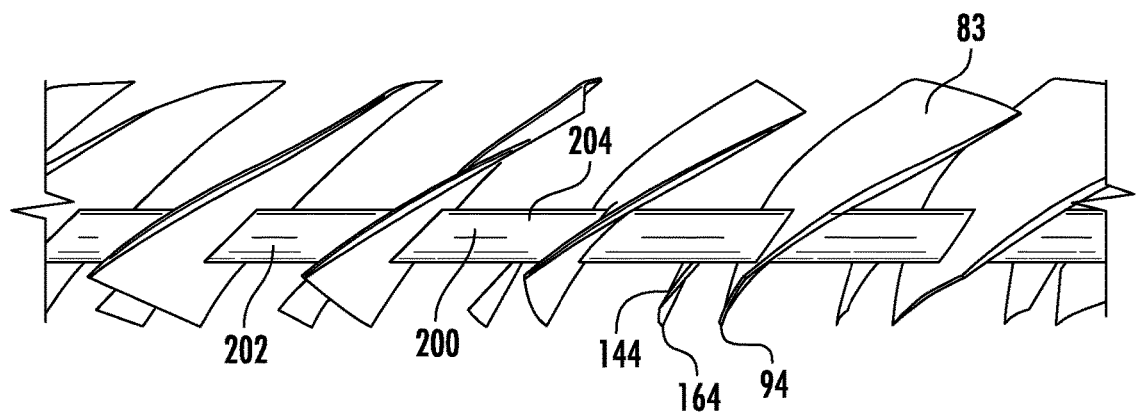
FIG. 7 is a detailed top plan view of a fan rotor including a shroud extending between the rotor airfoils and the splitter airfoils in accordance with an exemplary embodiment of the present disclosure.
Figure 8:
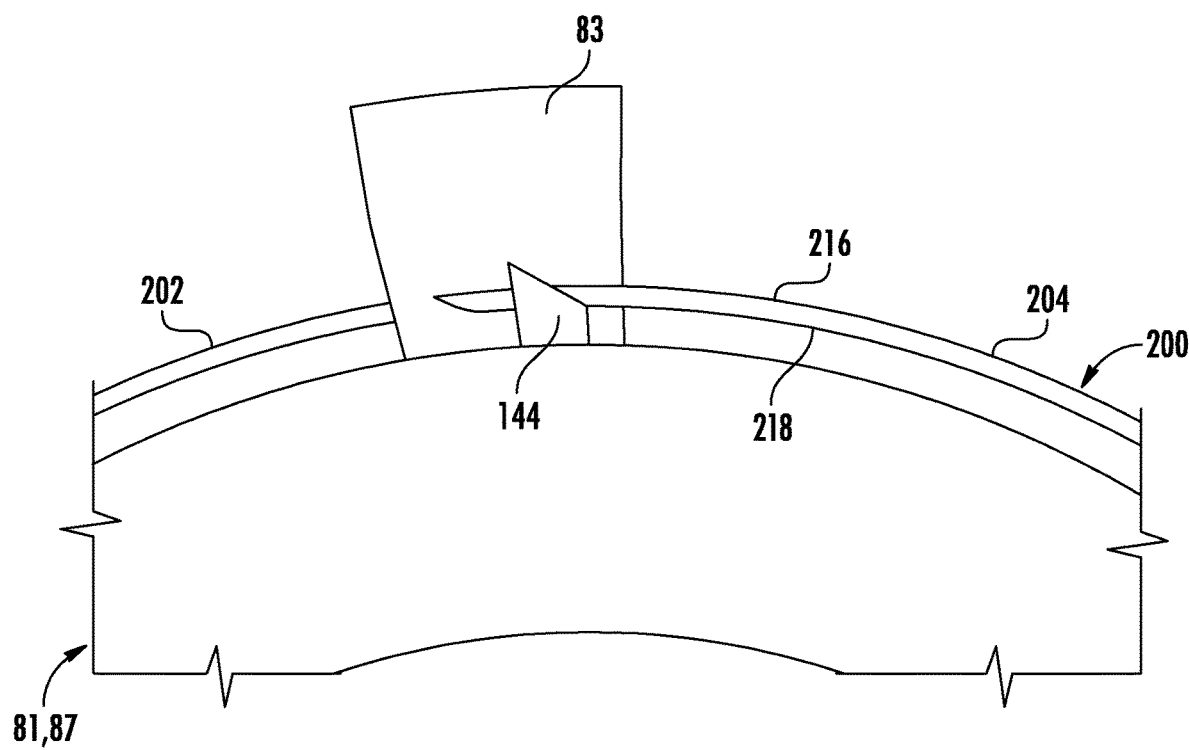
FIG. 8 is a detailed elevation view of a portion of a fan rotor including a shroud extending between the rotor airfoils and the splitter airfoils in accordance with an exemplary embodiment of the present disclosure.
Figure 9:
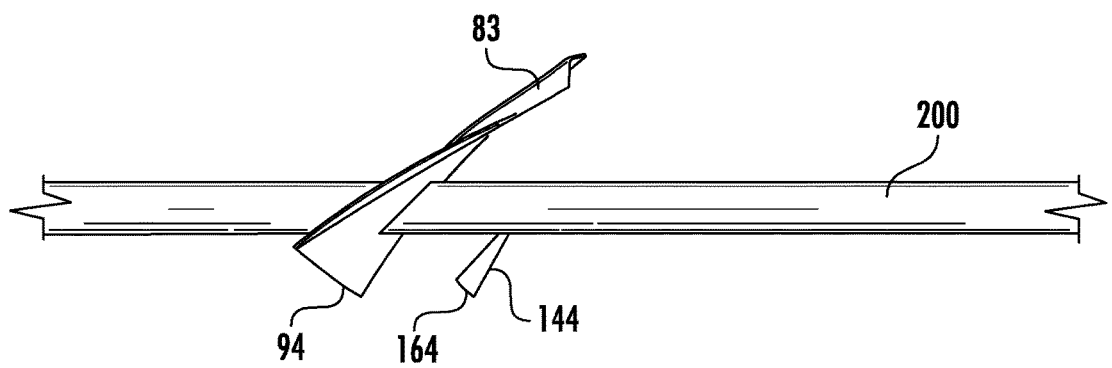
FIG. 9 is a detailed top plan view of a portion of a fan rotor including a shroud extending between the rotor airfoils and the splitter airfoils in accordance with an exemplary embodiment of the present disclosure.
Figure 10:
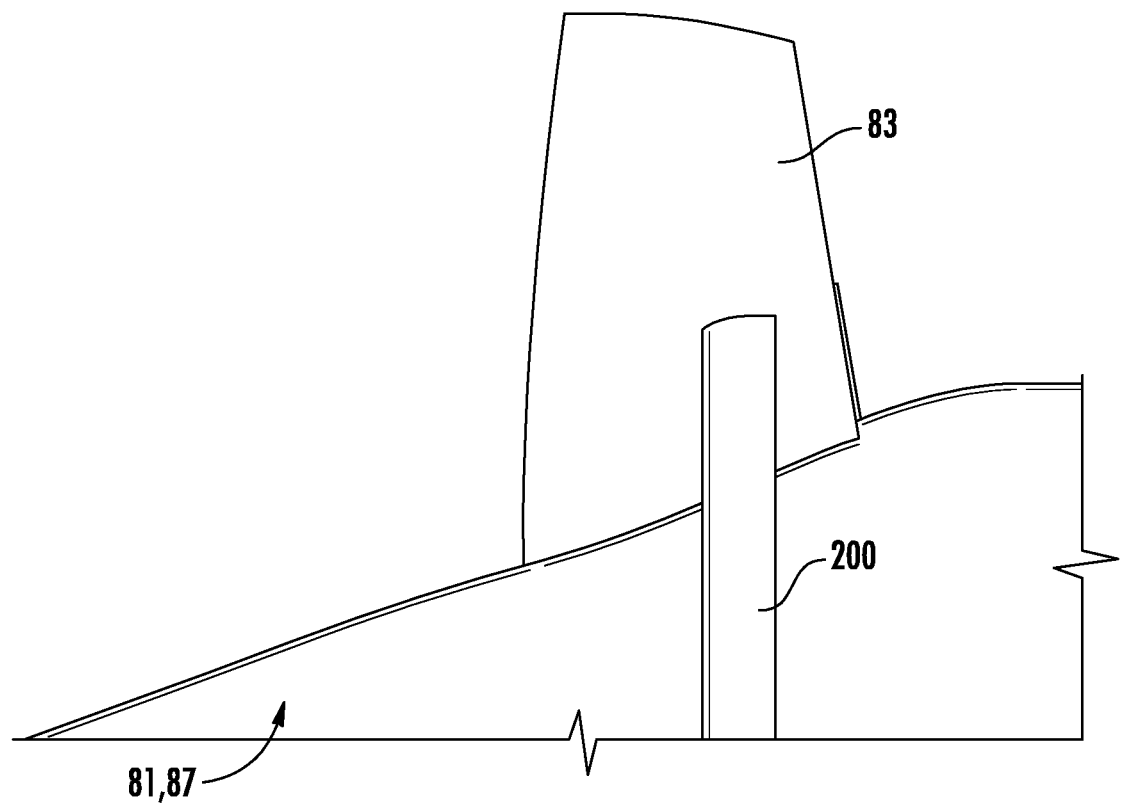
FIG. 10 is a perspective view of a portion of a fan rotor including a shroud connected to a rotor airfoil in accordance with an exemplary embodiment of the present disclosure.
Figure 16:
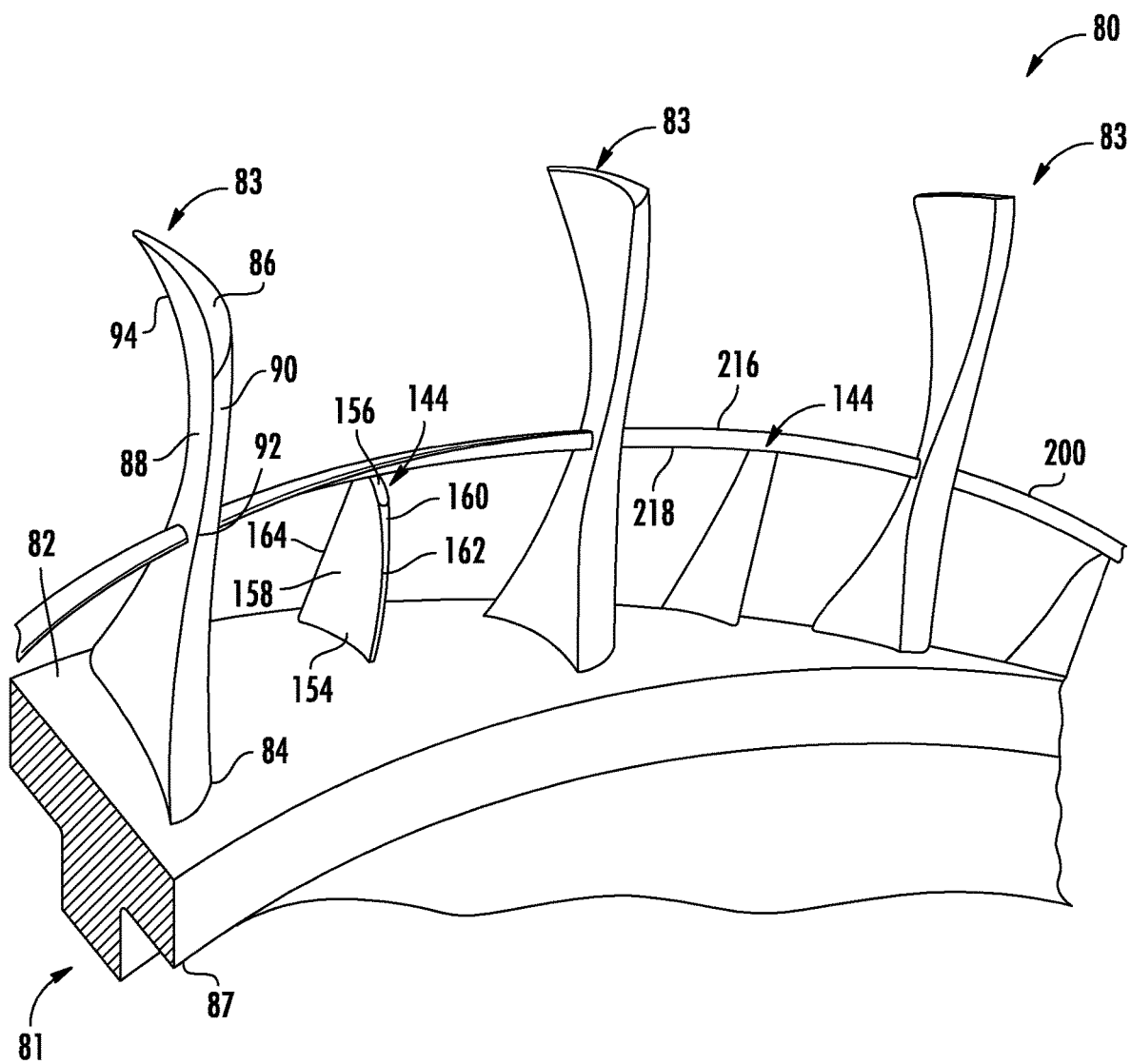
FIG. 16 is a perspective view of a portion of a fan rotor including a shroud extending between the rotor airfoils and the splitter airfoils in accordance with another exemplary embodiment of the present disclosure.

Referring to FIGS. 7, 9, and 16, in one embodiment, the splitter airfoils 144 are positioned so that their trailing edges 164 are at approximately the same axial position as the trailing edges 94 of the rotor airfoils 83, relative to the rotor 81. It is contemplated that the splitter airfoils 144 and the rotor airfoils 83 may be arranged in other configurations for a variety of different applications.

Advantageously, referring to FIGS. 2, 3, and 6-16, a fan rotor 81 of the present disclosure includes a shroud 200 extending between the rotor airfoils 83 and the splitter airfoils 144. In this manner, the shroud 200 of the present disclosure improves rotor aerodynamic performance and simultaneously reduces weight of the fan design. For example, the shroud 200 of the present disclosure improves rotor performance, e.g., partial tip shroud allowing corner clearance flow benefits, and reduces full airfoil hub thickness requirements for frequency placement by using the shroud 200 to set modal frequencies to thereby improve performance, hub pressure ratio, weight, and sensitivity to clearances.

Synergistically incorporating the splitter airfoils 144 with the rotor airfoils 83 using the shroud 200 solves the above-described technical problems and enables (1) a reduced weight design, (2) improved aerodynamic performance and stall range by enabling thinner airfoils and more aggressive levels of rotor leading edge forward sweep, (3) elimination of splitter blade tip vortex, which is another source of total pressure loss, further improving splittered rotor aerodynamic performance, (4) reduced sensitivity to rotor tip clearance by way of splittered rotor airfoil count reduction, and/or (5) supercharging of the fan hub airflow to higher total pressure levels before it travels into the core engine high pressure compressor inlet thereby helping to increase cycle operating pressure ratios.

In an exemplary embodiment, the shroud 200 of the present disclosure extends between and connects the rotor airfoils 83 and the splitter airfoils 144. In this manner, the shroud 200 enables a lower maximum thickness-to-chord ratio in the hub region of the main blade or airfoil 83, which both reduces the weight of the "bladed disk" or "blisk" and improves the aerodynamic performance of the main blade or airfoil 83. The shroud 200 also improves splitter blade or airfoil performance by the removal of the tip vortex that is present without the shroud 200.

Referring to FIGS. 2-3 and 6-10, in an exemplary embodiment, a shroud 200 of the present disclosure includes a leading edge 212, a trailing edge 214, a shroud superior surface 216 extending between the leading edge 212 and the trailing edge 214, and an opposing shroud inferior surface 218 extending between the leading edge 212 and the trailing edge 214. The shroud superior surface 216 and the shroud inferior surface 218 provide airfoil surfaces for guiding and controlling a fluid flow.

Referring to FIGS. 2-3 and 6-10, in one embodiment, the shroud 200 extends between and connects the rotor airfoils 83 and the splitter airfoils 144. For example, the shroud 200 is connected to the rotor airfoils 83 at a position radially inward of a tip 86 of each of the rotor airfoils 83 and radially outward of a root 84 of each of the rotor airfoils 83. Furthermore, in this embodiment, the shroud 200 is connected to a portion of a tip 156 of each of the splitter airfoils 144.

In an exemplary embodiment, by incorporating the splitter airfoils 144 under a shroud 200 disclosed herein, a system of the present disclosure enables supercharging the fan hub flow before traveling down the core into the high pressure compressor; reduces and/or eliminates the splitter tip vortex (another source of loss) thereby improving splitter performance; improving rotor aerodynamic performance; and simultaneously reducing the weight.

Referring to FIGS. 2, 3, 6, and 7, in an exemplary embodiment, the shroud 200 includes a plurality of linked shroud sections. For example, the shroud 200 may include a first shroud section 202 and a second shroud section 204.

Figure 11:
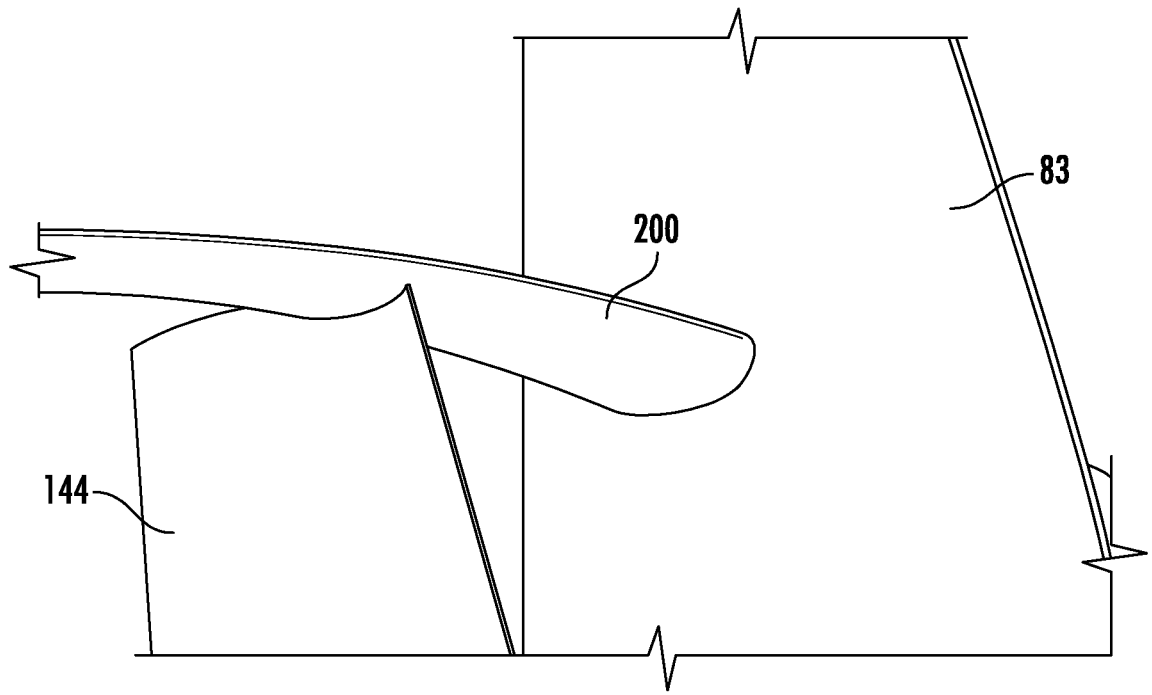
FIG. 11 is a perspective view of a portion of a fan rotor including a shroud extending between a rotor airfoil and a splitter airfoil in accordance with another exemplary embodiment of the present disclosure.

Referring to FIG. 11, in another exemplary embodiment, the shroud 200 extends between and connects the rotor airfoils 83 and the splitter airfoils 144. For example, the shroud 200 is connected to the rotor airfoils 83 at a position radially inward of a tip 86 (FIG. 4) of each of the rotor airfoils 83 and radially outward of a root 84 (FIG. 4) of each of the rotor airfoils 83. Furthermore, in this embodiment, the shroud 200 is connected to the splitter airfoils 144 at a position radially inward of a tip 156 (FIG. 5) of each of the splitter airfoils 144 and radially outward of a root 154 (FIG. 5) of each of the splitter airfoils 144. In the embodiment shown in FIG. 11, the shroud extends inward of the tip 156 of the splitter airfoil 144. It is contemplated that in other embodiments, the shroud 200 may extend further inward of the tip 156 of the splitter airfoil 144 towards the root 154 of the splitter airfoil 144 for other desired applications.

Figure 12:
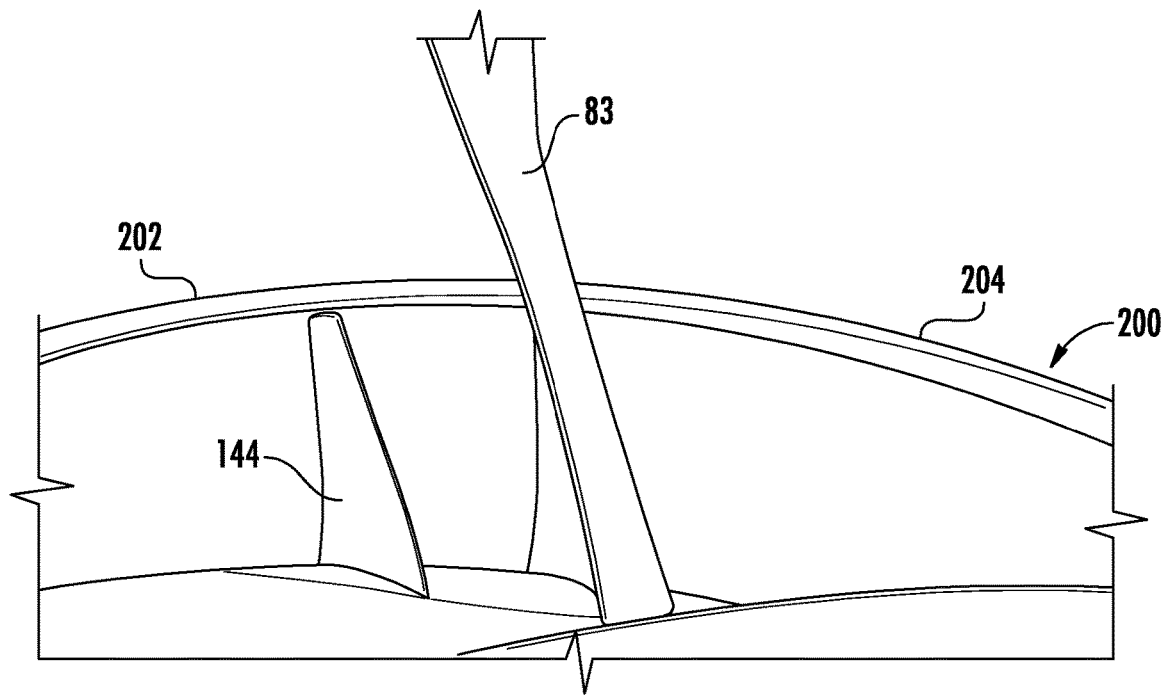
FIG. 12 is a perspective view of a portion of a fan rotor including a shroud extending between a rotor airfoil and a splitter airfoil in accordance with another exemplary embodiment of the present disclosure.
Figure 13:
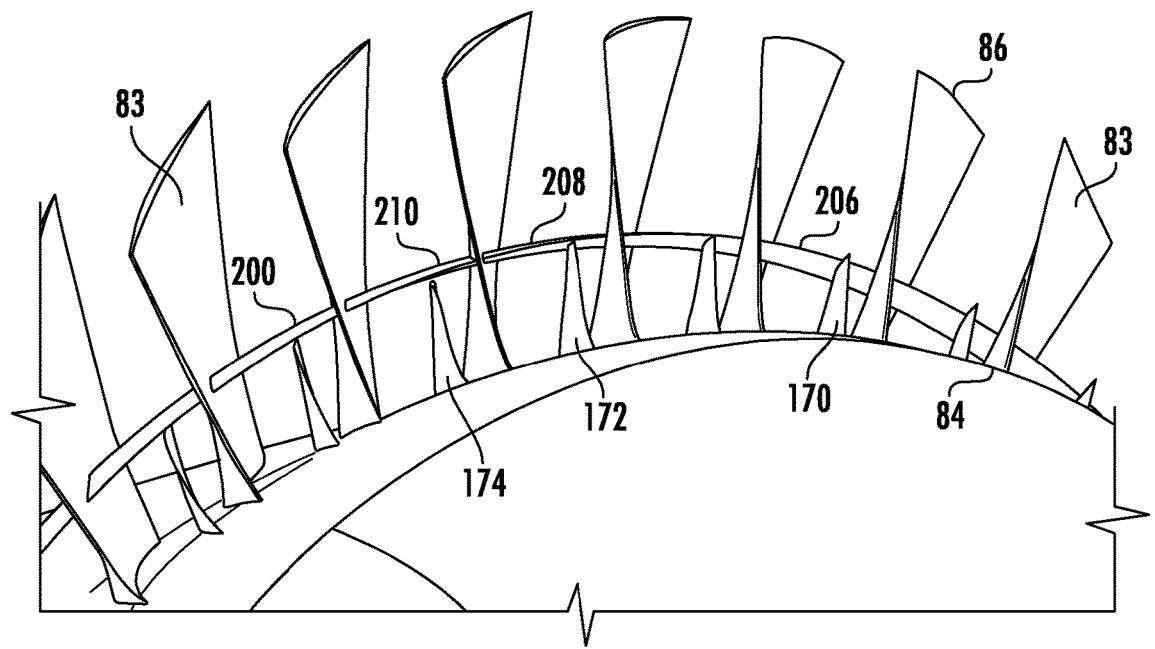
FIG. 13 is a perspective view of a portion of a fan rotor including a shroud extending between the rotor airfoils and the splitter airfoils in accordance with another exemplary embodiment of the present disclosure.

Referring to FIG. 13, in another exemplary embodiment, the shroud 200 extends between and connects the rotor airfoils 83 and the splitter airfoils 144. For example, the shroud 200 is connected to the rotor airfoils 83 at a position radially inward of a tip 86 of each of the rotor airfoils 83 and radially outward of a root 84 of each of the rotor airfoils 83. Furthermore, in other exemplary embodiments, different portions of the shroud 200 may be connected to different portions of the respective splitter airfoils 144. For example, a first portion 206 of the shroud 200 may be connected to a first splitter airfoil 170 in a first configuration, e.g., at a position radially inward of a tip 156 of the first splitter airfoil 170 and radially outward of a root 154 of the first splitter airfoil 170, as shown in FIG. 11. Furthermore, in an exemplary embodiment, a second portion 208 of the shroud 200 may be connected to a second splitter airfoil 172 in a second configuration, e.g., at a tip 156 of the second splitter airfoil 172, as shown in FIGS. 2-3 and 6-7. In other words, different sections of the shroud 200 may be connected to different portions and/or in different configurations with the respective splitter airfoils 144, 170, 172. Referring to FIGS. 12 and 13, in some embodiments, a third portion 210 of the shroud 200 may be in a third configuration, e.g., the shroud 200 may be disposed relative to a third splitter airfoil 174 at a position adjacent to a tip 156 of the third splitter airfoil 174.

In an exemplary embodiment, components of the rotor 81 of the fan 14, e.g., the disk 87, the rotor airfoils 83, and the splitter airfoils 144, may be constructed from any material capable of withstanding the anticipated stresses and environmental conditions in operation. Non-limiting examples of known suitable alloys include iron, nickel, and titanium alloys. In some embodiments, the disk 87, the rotor airfoils 83, and the splitter airfoils 144 are depicted as an integral, unitary, or monolithic whole. This type of structure may be referred to as a "bladed disk" or "blisk". The principles of the present invention are equally applicable to a rotor built up from separate components.

Further aspects of the invention are provided by the subject matter of the following clauses:

1. A fan for a gas turbine engine, the fan comprising: a rotor comprising at least one rotor stage including a rotatable disk defining a flowpath surface and an array of rotor airfoils extending outward from the flowpath surface; an array of splitter airfoils extending outward from the flowpath surface, wherein the splitter airfoils and the rotor airfoils are disposed in a sequential arrangement; and a shroud extending between the rotor airfoils and the splitter airfoils.

2. The fan of any preceding clause, wherein the shroud is connected to the rotor airfoils at a position radially inward of a tip of each of the rotor airfoils and radially outward of a root of each of the rotor airfoils.

3. The fan of any preceding clause, wherein the shroud is connected to the splitter airfoils at a position radially inward of a tip of each of the splitter airfoils and radially outward of a root of each of the splitter airfoils.

4. The fan of any preceding clause, wherein the shroud is connected to a portion of a tip of each of the splitter airfoils.

5. The fan of any preceding clause, wherein a first portion of the shroud is connected to a first splitter airfoil at a position radially inward of a tip of the first splitter airfoil and radially outward of a root of the first splitter airfoil, and wherein a second portion of the shroud is connected to a second splitter airfoil at a tip of the second splitter airfoil.

6. The fan of any preceding clause, wherein a third portion of the shroud is disposed relative to a third splitter airfoil at a position adjacent to a tip of the third splitter airfoil.

7. The fan of any preceding clause, wherein the shroud includes a plurality of linked shroud sections.

8. The fan of any preceding clause, wherein a chord dimension of the splitter airfoil is less than a chord dimension of the rotor airfoil.

9. The fan of any preceding clause, wherein a span dimension of the splitter airfoil is less than a span dimension of the rotor airfoil.

10. The fan of any preceding clause, wherein the splitter airfoils and the rotor airfoils are disposed in a staggered and alternating arrangement.

11. The fan of any preceding clause, wherein each splitter airfoil is located approximately midway between two adjacent rotor airfoils.

12. A gas turbine engine, comprising: a turbomachinery core operable to produce a flow of combustion gases; a turbine configured to extract energy from the combustion gases so as to drive a fan, wherein the fan includes: a rotor comprising at least one rotor stage including a rotatable disk defining a flowpath surface and an array of rotor airfoils extending outward from the flowpath surface; an array of splitter airfoils extending outward from the flowpath surface, wherein the splitter airfoils and the rotor airfoils are disposed in a sequential arrangement; and a shroud extending between the rotor airfoils and the splitter airfoils.

13. The gas turbine engine of any preceding clause, wherein the shroud is connected to the rotor airfoils at a position radially inward of a tip of each of the rotor airfoils and radially outward of a root of each of the rotor airfoils.

14. The gas turbine engine of any preceding clause, wherein the shroud is connected to the splitter airfoils at a position radially inward of a tip of each of the splitter airfoils and radially outward of a root of each of the splitter airfoils.

15. The gas turbine engine of any preceding clause, wherein the shroud is connected to a portion of a tip of each of the splitter airfoils.

16. The gas turbine engine of any preceding clause, wherein a first portion of the shroud is connected to a first splitter airfoil at a position radially inward of a tip of the first splitter airfoil and radially outward of a root of the first splitter airfoil, and wherein a second portion of the shroud is connected to a second splitter airfoil at a tip of the second splitter airfoil.

17. The gas turbine engine of any preceding clause, wherein a third portion of the shroud is disposed relative to a third splitter airfoil at a position adjacent to a tip of the third splitter airfoil.

18. The gas turbine engine of any preceding clause, wherein the shroud includes a plurality of linked shroud sections.

19. The gas turbine engine of any preceding clause, wherein a chord dimension of the splitter airfoil is less than a chord dimension of the rotor airfoil.

20. The gas turbine engine of any preceding clause, wherein a span dimension of the splitter airfoil is less than a span dimension of the rotor airfoil.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A fan for a gas turbine engine, the fan comprising:
    a rotor comprising at least one rotor stage including a rotatable disk defining a flowpath surface, an array of rotor airfoils extending outward from the flowpath surface, and each rotor air foil of the array of rotor airfoils having a rotor span dimension and being uninterrupted to provide a first airflow stream in a predetermined direction;
    an array of splitter airfoils extending outward from the flowpath surface, wherein the splitter airfoils and the rotor airfoils are disposed in a sequential arrangement, and each splitter airfoil of the array of splitter airfoils having a tip and a splitter span dimension and being uninterrupted to provide a second air flow stream in the predetermined direction that contributes to the first airflow stream, the splitter span dimension being less than the rotor span dimension; and
    a shroud extending between the rotor airfoils and the splitter airfoils, the shroud being positioned relative to the tip to counter aerodynamic vortex leakage pressure loss at the tip into the second air flow stream.

2. The fan of claim 1, wherein each rotor airfoil of the array of rotor airfoils and each splitter airfoil of the array of splitter airfoils being a single, continuous, and uninterrupted blade.

3. The fan of claim 2, each rotor airfoil of the array of rotor airfoils and each splitter airfoil of the array of splitter airfoils being a single, continuous, and uninterrupted blade.

4. The fan of claim 1, wherein the shroud is connected to the rotor airfoils at a position radially inward of a tip of each of the rotor airfoils and radially outward of a root of each of the rotor airfoils.

5. The fan of claim 4, wherein the shroud is connected to the splitter airfoils at a position radially inward of the tip of each of the splitter airfoils and radially outward of a root of each of the splitter airfoils.

6. The fan of claim 4, wherein the shroud is connected to a portion of the tip of each of the splitter airfoils.

7. The fan of claim 4, wherein a first portion of the shroud is connected to a first splitter airfoil at a position radially inward of the tip of the first splitter airfoil and radially outward of a root of the first splitter airfoil, and wherein a second portion of the shroud is connected to a second splitter airfoil at the tip of the second splitter airfoil.

8. The fan of claim 7, wherein a third portion of the shroud is disposed relative to a third splitter airfoil at a position adjacent to the tip of the third splitter airfoil.

9. The fan of claim 1, wherein the shroud includes a plurality of linked shroud sections.

10. The fan of claim 1, wherein a chord dimension of the splitter airfoil is less than a chord dimension of the rotor airfoil.

11. The fan of claim 1, wherein the splitter airfoils and the rotor airfoils are disposed in a staggered and alternating arrangement.

12. The fan of claim 1, wherein each splitter airfoil is located approximately midway between two adjacent rotor airfoils.

13. A gas turbine engine, comprising:
    a turbomachinery core operable to produce a flow of combustion gases;
    a turbine configured to extract energy from the combustion gases so as to drive a fan, wherein the fan includes:
        a rotor comprising at least one rotor stage including a rotatable disk defining a flowpath surface, an array of rotor airfoils extending outward from the flowpath surface, and each rotor airfoil of the array of rotor airfoils having a rotor span dimension and being uninterrupted to provide a first airflow stream in a predetermined direction;
        an array of splitter airfoils extending outward from the flowpath surface, wherein the splitter airfoils and the rotor airfoils are disposed in a sequential arrangement, and each splitter airfoil of the array of splitter airfoils having a tip and a splitter span dimension and being uninterrupted to provide a second air flow stream in the predetermined direction that contributes to the first airflow stream, the splitter span dimension being less than the rotor span dimension; and
        a shroud extending between the rotor airfoils and the splitter airfoils, the shroud being positioned relative to the tip to counter aerodynamic vortex leakage pressure loss at the tip into the second air flow stream.

14. The gas turbine engine of claim 13, wherein the shroud is connected to the rotor airfoils at a position radially inward of a tip of each of the rotor airfoils and radially outward of a root of each of the rotor airfoils.

15. The gas turbine engine of claim 14, wherein the shroud is connected to the splitter airfoils at a position radially inward of the tip of each of the splitter airfoils and radially outward of a root of each of the splitter airfoils.

16. The gas turbine engine of claim 14, wherein the shroud is connected to a portion of the tip of each of the splitter airfoils.

17. The gas turbine engine of claim 14, wherein a first portion of the shroud is connected to a first splitter airfoil at a position radially inward of the tip of the first splitter airfoil and radially outward of a root of the first splitter airfoil, and wherein a second portion of the shroud is connected to a second splitter airfoil at the tip of the second splitter airfoil.

18. The gas turbine engine of claim 17, wherein a third portion of the shroud is disposed relative to a third splitter airfoil at a position adjacent to the tip of the third splitter airfoil.

19. The gas turbine engine of claim 13, wherein the shroud includes a plurality of linked shroud sections.

20. The gas turbine engine of claim 13, wherein a chord dimension of the splitter airfoil is less than a chord dimension of the rotor airfoil.

21. A fan for a gas turbine engine, the fan comprising:
- a rotor comprising at least one rotor stage including a rotatable disk defining a flowpath surface, an array of rotor airfoils extending outward from the flowpath surface;
- an array of splitter airfoils extending outward from the flowpath surface, wherein the splitter airfoils, the rotor airfoils being disposed in a sequential arrangement; and
- a shroud extending between the rotor airfoils and the splitter airfoils;
- wherein the shroud is connected to the rotor airfoils at a position radially inward of a tip of each of the rotor airfoils and radially outward of a root of each of the rotor airfoils; and
- wherein a first portion of the shroud is connected to a first splitter airfoil at a position radially inward of the tip of the first splitter airfoil and radially outward of a root of the first splitter airfoil, and wherein a second portion of the shroud is connected to a second splitter airfoil at the tip of the second splitter airfoil.

* * * * *